United States Patent
Skelton et al.

(10) Patent No.: US 9,217,690 B2
(45) Date of Patent: Dec. 22, 2015

(54) COOLANT LOSS DETECTION AND REMEDIATION IN A LIQUID COOLED BATTERY PACK

(71) Applicant: GM Global Technology Operations LLC, Detroit, MI (US)

(72) Inventors: Scott M. Skelton, Belleville, MI (US); Kulwinder Singh, Lake Orion, MI (US); Richard Marsh, Beverly Hills, MI (US); Doug Parks, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 228 days.

(21) Appl. No.: 13/747,922

(22) Filed: Jan. 23, 2013

(65) Prior Publication Data

US 2013/0197745 A1  Aug. 1, 2013

Related U.S. Application Data (60) Provisional application No. 61/590,558, filed on Jan. 25, 2012.

(51) Int. Cl.

| | | |
|---|---|---|
| *G01M 17/00* | (2006.01) | |
| *G06F 11/30* | (2006.01) | |
| *G06F 7/00* | (2006.01) | |
| *G07C 5/00* | (2006.01) | |
| *G01M 17/007* | (2006.01) | |
| *G01M 3/32* | (2006.01) | |
| *G06F 19/00* | (2011.01) | |

(52) U.S. Cl.
CPC .......... *G01M 17/007* (2013.01); *G01M 3/3227* (2013.01); *G01M 3/3245* (2013.01)

(58) Field of Classification Search
CPC ..... G01M 3/007; G01M 17/007; F01P 11/18; G21C 17/022
USPC .................. 327/141; 73/290 R, 40.5; 429/62; 340/620; 701/31.4, 34.4
See application file for complete search history.

(56) References Cited

U.S. PATENT DOCUMENTS

| | | | |
|---|---|---|---|
| 5,668,536 A * | 9/1997 | Gottshall et al. | 340/620 |
| 8,253,451 B1 * | 8/2012 | Hsieh et al. | 327/141 |
| 2002/0194910 A1 * | 12/2002 | Schelhas et al. | 73/290 R |
| 2010/0262334 A1 * | 10/2010 | Yoshiyama | 701/33 |
| 2012/0003515 A1 * | 1/2012 | Eisenhour | 429/62 |
| 2013/0067994 A1 * | 3/2013 | Worden et al. | 73/40.5 R |

* cited by examiner

*Primary Examiner* — Helal A Algahaim
*Assistant Examiner* — Mahmoud Ismail
(74) *Attorney, Agent, or Firm* — Dinsmore & Shohl LLP (57) ABSTRACT

An automotive battery module with one or more battery cells and a coolant loss detection and remediation system cooperative with coolant that is configured to provide thermal management of the battery module. Coolant levels in or around the battery module may be detected, while cooperation with a controller permits corrective action in the event that a leakage of coolant is detected. The controller senses a coolant level sensor which is located in a coolant reservoir to determine when the coolant level drops below a predetermined level. When the coolant level is determined to be low, the controller reports the low level condition and takes remedial action. The controller also has a set of enablement conditions that must be satisfied before the controller senses the coolant level sensor.

19 Claims, 6 Drawing Sheets

COOLANT LOSS DETECTION AND REMEDIATION IN A LIQUID COOLED BATTERY PACK

The present application hereby claims priority under 35 U.S.C. §119(e) to Provisional U.S. Application No. 61/590,558 filed Jan. 25, 2012, entitled "COOLANT LOSS DETECTION AND REMEDIATION IN A LIQUID COOLED BATTERY PACK."

BACKGROUND OF THE INVENTION

This invention relates generally to a method and system for the detection of liquid cooling status for batteries, as well as for a method and system for correcting coolant flows through batteries in situations where the coolant flow needs to be adjusted.

Lithium-ion and related batteries, collectively known as a rechargeable energy storage system (RESS), are being used in automotive applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes batteries ideal to serve as part of a propulsion system for cars, trucks, buses, motorcycles and related vehicular platforms. In the present context, a cell is a single electrochemical unit, whereas a battery is made up of one or more cells joined in series, parallel or both, depending on desired output voltage and capacity.

The generation of propulsive power from the RESS also produces significant thermal loads. As such, a RESS-based system preferably includes a cooling system to avoid unacceptably high levels of heat being imparted to the batteries and ancillary equipment. Keeping excess heat away from these, as well as other, thermally-sensitive components helps to promote their proper operation and long life. In one particular form, such a cooling system may include the passive or active circulation of a liquid coolant in, around or otherwise thermally adjacent to the batteries or other heat-generating components. One or more heat exchangers may be used to convey excess heat away. For example, the Chevrolet Volt, a vehicle manufactured by the Assignee of the present invention, has three heat exchangers for use in conjunction with its RESS, including a liquid-to-air radiator, a high voltage electric heater and a refrigerant-to-coolant chiller. Controllers monitor for loss of isolation between the high voltage system and the rest of the vehicle, as well as for electrical shorts within the battery.

Designers frequently take the possibility of accidents into consideration when designing a vehicular platform. With the advent of battery power (and the concomitant large amounts of electrical energy produced thereby), it is preferable to likewise design the vehicle to be resistant to accidents or related impact to avoid the uncontrolled release of significant levels of electrical current. One particular concern for battery designers pertains to the coolant discussed above, where leakage into the battery may provide an efficient and unintended path for the conveyance of electrical energy in the event of a disruptive event, such as due to component wear or the aforementioned accident. In one undesirable form, the coolant may deliver the current to internal electronic components—such as circuit board or the like—that are not configured to accept large amount of current. Exacerbating this concern is that there may be a latency period between the time the damage is incurred and when a leakage may progress to sensitive electrical components. In one form, it may take days to weeks following a damage-inducing event (such as a crash) for the coolant to leak into the battery or batteries and the sensitive electronics contained therein.

The use of a multi-pronged heat management equipment (such as that mentioned above in conjunction with the Chevrolet Volt) is useful for its intended purpose. Nevertheless, it would be beneficial to also provide early detection of loss if coolant into the battery following an accident or related incident where a rapid release of electrical or thermal energy could occur. It would be further beneficial to implement automated corrective actions in the event of a pending discharge of energy when coolant has leaked into the battery.

SUMMARY OF THE INVENTION

Systems and methods as described and shown herein can help reduce the likelihood of damage during a coolant leakage condition in or around a battery pack. As discussed above, battery packs are made up of numerous battery modules each of which is in turn made up of one or more battery cells that deliver electrical current to a load. One such non-limiting example of a load includes the equipment used to provide motive power to the powertrain of an automobile, as well as auxiliary applications associated with operating the vehicle. In the present context, the term "motive power" describes a battery pack capable of providing more than mere starting power for another power source (such as the aforementioned ICE); it includes battery packs capable of providing sustained power sufficient to propel a vehicle in a manner consistent with that for which it was designed. It will be appreciated by those skilled in the art that such batteries may also store energy recaptured from kinetic energy, such as regenerative braking or excess energy from an ICE. In one form, the current generated by the battery pack may be used to run one or more electric motors that in turn may be used to turn one or more wheels. Other members (for example, structural members) are placed in thermal communication with the battery cell to enable heat exchange between them.

According to one aspect of the invention, a method to detect a coolant leak in an automotive battery pack is described. A controller senses a switch signal from a coolant level sensor during a sampling window. The sampling window is discreet chunk of time in which the switch signal is evaluated. A fail counter counts the amount of time a specified switch signal is present in the sampling window. After the sampling window has passed, the fail counter is reset. A failure count is recorded in a computer readable medium if the fail counter equals or exceeds a third threshold. The third threshold is a predetermined value in the computer readable medium. The switch signal is sensed with more than one sampling window sequentially during a cycle and a moving window count is incremented by one in the computer readable medium when at least one failure count is recorded for the cycle. When a moving window count equals or exceeds a window threshold value, a coolant leak is reported. Reporting the coolant leak includes reporting a Diagnostic Trouble Code and illuminating a Malfunction Indicator Light.

According to another aspect of the invention, remedial action is taken when the coolant leak is reported. Remedial action may include disabling a charging circuit of a vehicle, disabling the use of a high voltage circuit of the vehicle, and/or disabling a propulsion control unit of the vehicle. Furthermore, the controller may be enabled to sense the coolant level sensor when a set of algorithm conditions are met. This allows for sensing the level of the coolant when the vehicle is in a condition for indicating the proper level of coolant. The algorithm conditions include detecting a temperature of a battery pack and enabling the sensing of the coolant level sensor if the temperature of the battery pack is within a predetermined pack temperature range. Detecting a temperature of a coolant and enabling the sensing of the coolant level sensor if the temperature of the coolant is within a predetermined coolant temperature range. Detecting a vehicle speed and enabling the sensing of the coolant level sensor if the speed of the vehicle is within a predetermined speed and detecting a vehicle orientation and enabling the sensing of the coolant level sensor if the vehicle orientation matches a predetermined orientation. Detecting a coolant pump speed and enabling the sensing of the coolant level sensor if the coolant pump speed is sufficient to reduce an amount of trapped air in a thermal management system.

According to another aspect of the invention a method of detecting a coolant leak in an automotive battery pack is described. A controller senses a switch signal from a coolant level sensor during a sampling window. The sampling window is discreet chunk of time in which the switch signal is evaluated. A fail counter counts the amount of time a specified switch signal is present in the sampling window. After the sampling window has passed, the fail counter is reset. A failure count is recorded in a computer readable medium if the fail counter equals or exceeds a third threshold. The third threshold is a predetermined value in the computer readable medium. The switch signal is sensed with more than one sampling window sequentially during a cycle. A first count is incremented by one in the computer readable medium when at least one failure count is recorded for the cycle and a second count is increment by on for a number of cycles since the first count was incremented from zero. Both the second count and the first count are reset when the second count exceeds a second threshold value. When the first count equals or exceeds the first threshold value before the second count equals or exceeds the second threshold value a coolant leak is reported.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
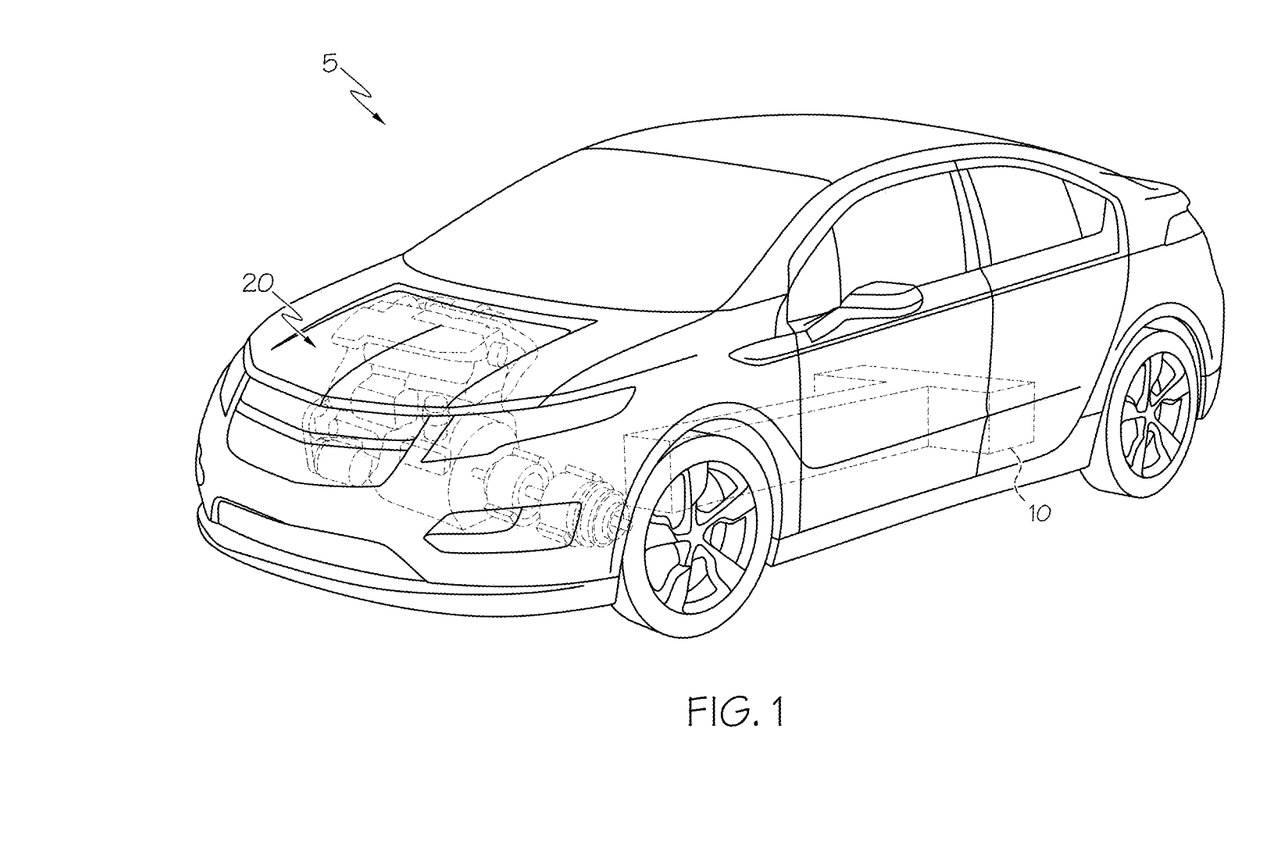
FIG. 1 shows a vehicle with a hybrid propulsion system in the form of a battery pack and an internal combustion engine according to an aspect of the present invention.

Referring first to FIG. 1, a vehicle 5 includes a hybrid propulsion system in the form of a battery pack 10 and a conventional ICE 20. As mentioned above, such a vehicle is known as an HEV. Battery pack 10 employs numerous battery cells arranged into modules (not shown) that are typically arranged in a repeating array. In one typical example, battery pack 10 may contain between about two hundred to three hundred individual battery cells (to be discussed in more detail below), although it will be appreciated by those skilled in the art that additional or fewer cells may be needed, depending on the power or energy required. It will be further appreciated by those skilled in the art that vehicle 5 may not require an ICE 20; in such case, rather than being an HEV, it is an EV; either form is within the scope of the present invention.

Figure 2:
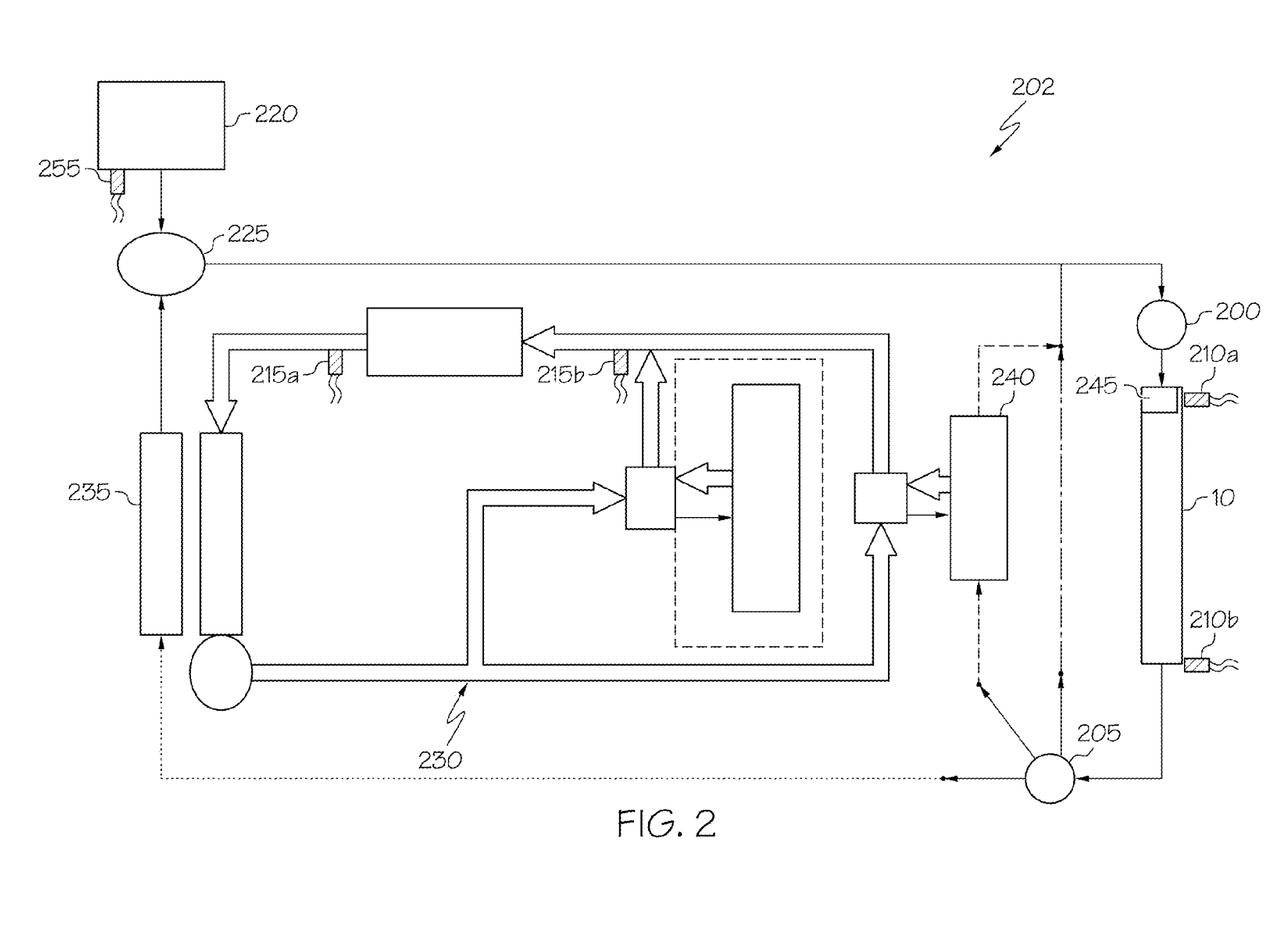
FIG. 2 is a simplified view of a thermal management system supporting the RESS according to an aspect of the present invention.

Referring next to FIG. 2, a simplified view of a thermal management system supporting the RESS based on battery pack 10 from FIG. 1 is shown. It will be appreciated by those skilled in the art that other battery components necessary for operation are not shown in order to better emphasize the coolant level loss detection and remediation features of the present invention. Examples of such presently-omitted components include frames and related structure, cooling plates and fins, insulative sheets, temperature-sensing equipment or the like. The system shown in FIG. 2 is an example of a RESS thermal management system 202 which contains many sub-components, including a coolant pump 200, multi-port valve 205, temperature sensors 210a and 201b, pressure sensors 215a and 215b, coolant reservoir 220, air separation device 225, liquid-to-air radiator 235, a refrigerant chiller system which includes a refrigerant-to-coolant heat exchanger 240, high voltage heater 245, high voltage battery (not shown) and other ancillary connections and hoses. The coolant pump 200 is an electronically controlled, variable speed device for circulating coolant through the RESS thermal management system 202. The multi-port valve 205 is an electronically controlled, variable position valve used to select which loop the coolant flows through. The system shown has 3 loops: a liquid-to-air radiator loop (dotted line), a refrigerant-to-coolant heat exchanger loop (dashed line), and a bypass loop (dot/dash line). The high voltage heater 245 is always in series with whichever of the 3 above loops is selected. All other aforementioned devices are used to support the above 3 heat transfer loops or used by the control system for determining which loop to select. The liquid-to-air radiator loop (dotted line) uses the liquid-to-air radiator 235 to exchange heat between the ambient air and the coolant, while the chiller loop (dashed line) uses the A/C refrigerant system in parallel with the cabin heating, ventilation and air conditioning (HVAC) system 230 (double parallel line) to chill the coolant passing through a the refrigerant-to-coolant heat exchanger 240. The bypass loop (dot/dash line) loops the coolant back through the battery pack 10 either when the high voltage heater 245 is being used or no heat transfer is desired. The coolant level sensor 255 is fluidly coupled to the coolant reservoir 220. The coolant reservoir 220 and the air separation device 225 are located at the highest elevation point in the RESS thermal management system 202. If coolant were to leak from any point in the RESS thermal management system 202, a resulting reduction in the coolant volume in the coolant reservoir 220 may be detected by the coolant level sensor 255.

In essence, the coolant level sensor 255 acts as a switch that is configured to operate in one of two states corresponding to a "normal" coolant level and a "low" coolant level. Circuit failure readings of the switch may include "Out-of-range Low", "Out-of-range High" and "Invalid, but in-range" values. These ranges as sensed by a controller 530 (FIG.5) are plausible conditions which indicate there is a fault with the coolant level sensor 255 or associated circuitry and/or wiring such that the true coolant level in the coolant reservoir 220 state cannot be accurately determined. The coolant level sensor 255 signally communicates a switch signal, i.e. an open switch signal or a closed switch signal. Signally communicates includes actively broadcasting the switch signal and includes passively reading the switch signal. The controller 530 may be electrically coupled to the coolant level sensor 255 and running a dual fault maturation algorithm described below comprising parameters configured to determine when a leak has occurred in the RESS thermal management system 202. For example, the leak may occur in at least one battery cell within the rechargeable energy storage system, or through a gasket or seal within the RESS thermal management system 202.

There are enablement factors that may impact the coolant level in the coolant reservoir 220. These enablement factors may include one or more of: a predetermined battery temperature range such as for example above 0° C., a predetermined coolant temperature range such as for example above 0° C., trapped air in the RESS thermal management system 202, vehicle 5 dynamics (e.g. a predetermined speed such as any movement of the vehicle and/or driving) and vehicle 5 orientation (e.g. a predetermined orientation such as is the vehicle 5 on a horizontal surface and/or level). The trapped air enablement factor determines if a coolant pump speed is sufficient to reduce an amount of trapped air in a thermal management system 202. The enablement factors are based off of predetermined values that are determined based on the type of battery system in use, type of vehicle, and operating conditions. Therefore, based off of the above example predetermined values, the detection algorithm may only run at zero vehicle speed, when the vehicle 5 is level, and the battery and coolant temperatures are both above 0° C. Low coolant in the coolant reservoir 220 may be sensed by the coolant level sensor 255 on two of the last three cycles to set the MIL or over a number of cycles until reset. The parameters of a cycle are described in further detail below. When low coolant is detected as described above, active isolation between the high voltage system and the rest of the vehicle is deemed lost, or any related fault prohibiting proper detection of active isolation or low coolant, remedial actions as described in greater detail below may be taken.

A Diagnostic Trouble Code (DTC) message (such as "Service High Voltage Charging System") may be shown to the vehicle operator and stored in a computer readable medium such as memory for later retrieval and diagnostics. A DTC message is part of the On-Board Diagnostics II (OBD II) protocol. Likewise, a MIL (malfunction indicator light) may also be indicated. A MIL may include any visual or audible signal to alert an operator of the vehicle 5 that an error has been detected. Remedial actions may be taken to ensure that damage does not occur to the RESS thermal management system 202. In some embodiments, the DTC may be a prerequisite to taking remedial actions. In some embodiments, remedial action may include disabling the charging circuit of the battery pack 10 after a set amount of time, thereby preventing (substantially) immediate disablement of the vehicle 5. To reset the DTC and/or the MIL, a simple 12 volt reset may be employed, i.e. disconnecting and reconnecting the 12 volt battery (not shown). In some embodiments, a specific procedure may be followed to reset the MIL and/or DTC, such as a code clear by diagnostic equipment not part of the vehicle 5, in order to restore the vehicle 5 to normal operation. Requiring the use of the diagnostic equipment to send a specific command to restore the system to its original state means that the 12 volt reset won't work and the MIL and/or DTC won't clear even if the previously mentioned fault conditions are removed or repaired. The remedial action may include but are not limited to disabling a charging circuit of the vehicle, disabling the use of a high voltage circuit of the vehicle, disabling a propulsion control unit of the vehicle, and combinations thereof.

Figure 3:
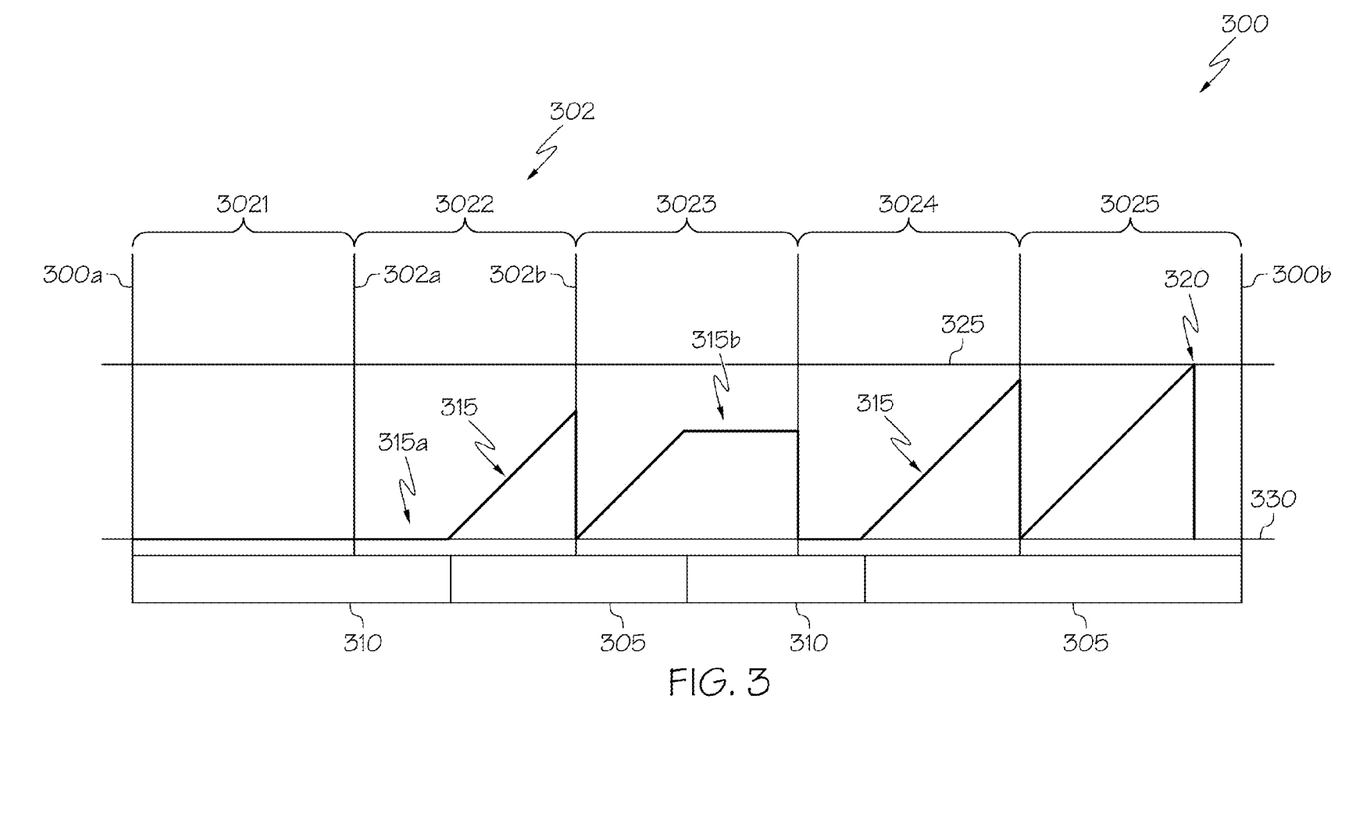
FIG. 3 shows, a switch signal that correspond to a low coolant level generated according to an aspect of the present invention.

Referring next to FIG. 3, the dual fault maturation algorithm was developed to account for the many enablement factors as discussed above that may affect a proper coolant level reading by the coolant level sensor 255 of FIG. 2. The dual fault maturation algorithm uses many parameters described below to determine one and/or two fault conditions. The two fault conditions of the dual fault maturation algorithm are a low cycle determination and a DTC fault determination. The low cycle determination may be used on any cycle 300 the vehicle 5 (FIG. 1) takes to determine whether a low coolant condition was sensed on that cycle 300. The cycle 300 may be defined as the entire time between two events (start event 300a, stop event 300b) where the vehicle 5 is in an active state. In some embodiments, the active state may include when the vehicle is on and/or when a propulsion system is active and may include when the vehicle 5 is not moving. The active state may be indicative that the vehicle 5 is moving or not moving but in a mode that enables movement. The active state does not include when the vehicle 5 is charging and/or fueling, or if the vehicle is in an off state. In another embodiment, the active state may include anytime the controller 530 (FIG. 6) is awake and able to run computations. This may include, but is not limited to, when the vehicle 5 is driving, charging, fueling, idling, or any other state where the controller 530 is awake and able to run computations. In either embodiment, the dual fault maturation algorithm may be used across one or more cycles to ensure that the low coolant level sensed by the coolant level sensor 255 is not affected by one or more of the external factors described above.

Referring back to FIG. 3, the low cycle determination evaluates the coolant level sensor 255 sensed coolant level in one or more sampling windows 302 of time on any given cycle 300. A single sampling window 302 is represented between the vertical grid lines 302a and 302b. There are five, sampling windows 302 shown in the cycle 300 of FIG. 3 running sequentially from left to right: a first sampling window 3021, a second sampling window 3022, a third sampling window 3023, a fourth sampling window 3024, and a fifth sampling window 3025. This disclosure is not limited to five sampling windows 302. During the duration of the cycle 300, and while the vehicle 5 is in the active state, the sequential one or more sampling windows 302 sample the coolant level sensor 255 a specified switch signal represented by the closed switch signal 305 at a low coolant level and the open switch signal 310 at a normal coolant level. In another embodiment, the specified switch signal may be represented by an open switch signal at low coolant levels and a closed switch signal at normal coolant levels. The sampling window 302 may be any duration with the minimum and maximum duration being limited by the hardware configuration of the controller 530. The duration may be between about 0.01 seconds to ten seconds, or preferably between about three seconds to about six seconds, or more preferably a five second sampling window.

The low cycle determination is based off of two counters, a fail counter 315 and a fail count limit 320. The fail counter 315 counts a time increment (i.e. software iteration) the coolant level sensor 255 is sensing a low cool level represented by the closed switch signal 305 (specified switch signal in this embodiment) within the sampling window 302. For example, in the second sampling window 3022, the fail counter 315 is held at a zero count 315a until the coolant level sensor 255 indicates the closed switch signal 305. The fail counter 315 starts to increment up by one towards a third threshold 325 for each software iteration the closed switch signal 305 is active. In the second sampling window 3022, the fail counter 315 does not reach the third threshold 325 before the duration of the second sampling window 3022 has passed so the fail counter 315 is reset to zero 330. Continuing the example, the fail counter 315 starts to increment up by one software iteration again in the third sampling window 3023 because the coolant level sensor 255 still indicates a closed switch signal 305. When the coolant level sensor 255 senses the normal coolant level and indicates the open switch signal 310, the fail counter 315 ceases counting as shown by a plateau 315b until the end of the sampling window 302 when the fail counter 315 is reset to zero 330. The use of the sampling window 302 allows the dual fault maturation algorithm to factor out any low coolant level signals that are a result of one or more of the enablement factors as discussed above.

The fail counter 315 in the fifth sampling window 3025 counts enough software iterations of low level coolant to reach the third threshold 325 during the sampling window 302. The fail count limit 320 may store in a computer readable medium a failure count (not shown) each time the fail counter 315 equals or exceeds the third threshold 325. The fail count limit 320 may reset to zero when the stop event 300b of cycle 300 is reached or the fail counter 315 may start with the failure count from previous cycle and continue to increase the failure count until a DTC and/or MIL reset is completed. Furthermore, a set of algorithm conditions may need to be satisfied to enable the sensing of the switch signal. The set of algorithm conditions may include one or more of: one or more of the enablement factors, coolant pump 200 speed, and/or time. It is important to note that the sample window is not a moving window, i.e. it is discrete chunk of time. As used throughout the example, the software iteration (i.e. time increment) is an increment of the duration of the sampling window 302. The duration of the sampling window 302 is the discrete chunk of time eluded to above. Multiple software iteration are additive to equal the duration of the sampling window 302 and are set by the hardware configuration of the controller 530. For example, the software iteration may be one second and the duration of the sampling window may be five seconds. Therefore there are 5 software iterations within one sampling window 302.

Figure 4:
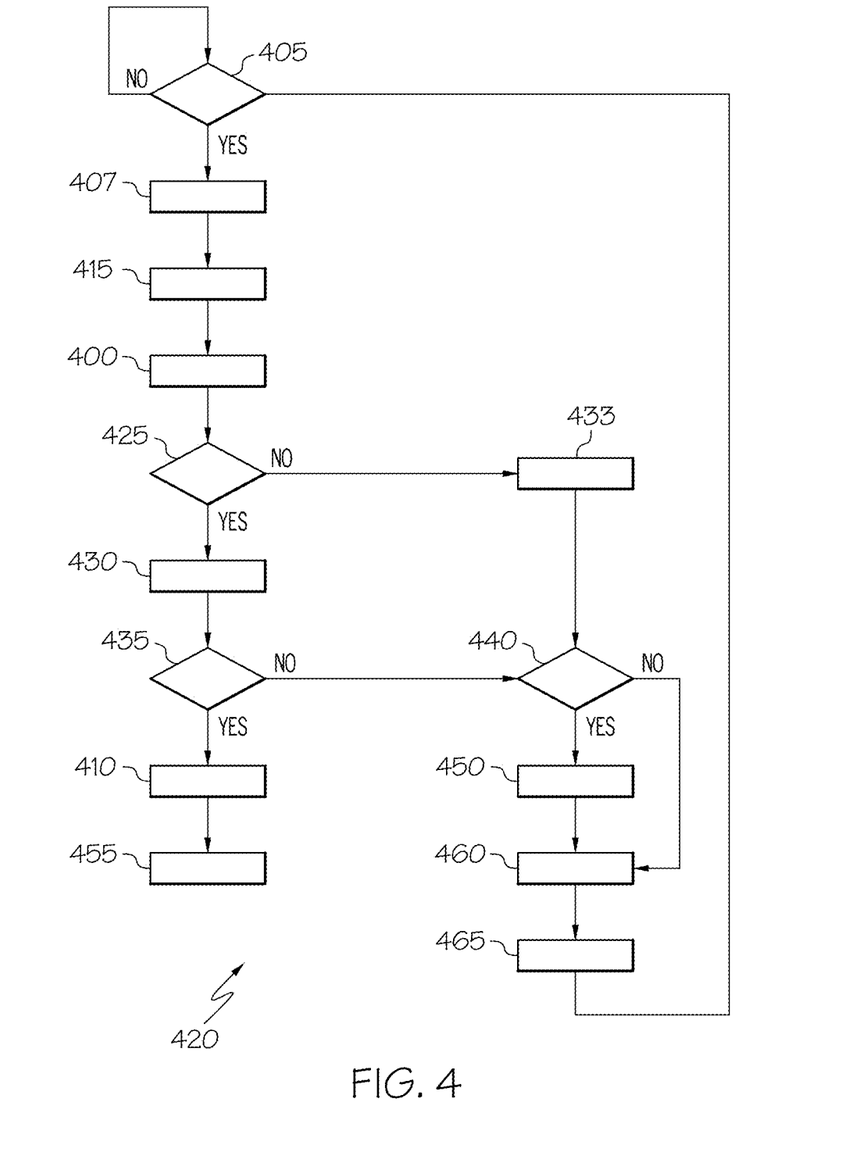
FIG. 4 depicts a flowchart of the Diagnostic Trouble Code determination according to an aspect of the present invention.

Referring to FIG. 4, the second fault condition of the dual fault maturation algorithm is the DTC fault determination 400. In one embodiment, the DTC fault determination 400 may monitor the failure count from the first fault condition of the algorithm for one or more cycles. The DTC fault determination 400 may use one or more counters (counts) and one or more thresholds to make the determination of when to report the DTC and/or illuminate the MIL 410. The counters and thresholds may reside in the computer readable medium and/or memory for use by the DTC fault determination 400 and the controller 530. For example, the DTC fault determination 400 may use a first count, a second count, a first threshold value and a second threshold value. The first count may be associated with the failure count for a specific cycle and the second count may be associated with the number of cycles since the first count was first incremented from zero to one. The first count, second count, first threshold value, and second threshold value are values stored in the computer readable medium. The first count and second count may be incremented by any integer, usually by one. The first count and the second count are retained through most vehicle modes until reset to zero. The first threshold value and second threshold value are retained indefinitely until changed through software updates or other changes to the vehicle systems. The first threshold value may be used to report the DTC and/or illuminate the MIL when the first count equals or exceeds the first threshold value. The second threshold value may be used to reset both the first count and the second count to zero when the second count equals or exceeds the second threshold.

The DTC fault determination may run when the vehicle 10 is in an active state 405 as described above. When the vehicle 10 is in an active state 405, the cycle 300 begins 407. Once the dual fault maturation algorithm 420 makes a low trip determination 415, the dual fault maturation algorithm 420 evaluates the DTC fault determination 400. The DTC fault determination 400 may increment the first count by one 430 in the computer readable medium when at least one failure count 425 was recorded for the cycle 300. On subsequent cycles, the DTC fault determination 400 will continue to increment the first count when at least one 430 when a failure count 425 is recorded for that cycle 300. For example, if on a first cycle, the failure count is indicated, the first count will be incremented by one from zero. Furthermore, the second count will be incremented to one 430 from zero. If, on a second cycle, the failure count is not indicated, the first count will stay at one, but the second count will increment again by one 433 to have a value of two in the computer readable medium. If on a third cycle, the failure count is indicated, both the first count and second count are incremented 430 so now in the computer readable medium, first count equals two and the second count equals three. The DTC fault determination 400 may continue until either the first count equals the first threshold value 435 or the second count equals the second threshold value 440. If the second count equals or exceeds the second threshold value 440, the first count and second count are reset to zero 450. If the first count equals or exceeds the first threshold value 435, the DTC is reports and/or the MIL is illuminated 410. Remedial action may be taken 455. If at the end of the cycle 300, neither the first count equal or exceeds the first threshold value 435 or the second count equals or exceeds the second threshold value 440, than the dual fault maturation algorithm may wait till the vehicle 10 is not longer in an active state 460 and end 465 the cycle 300.

In another example, based on California Air Resources Board (CARB) precedence, the first threshold value may be two and the second threshold value may be three. This illustrates that the failure count must indicate a low coolant level on two of the last three cycles to report the DTC and/or illuminate the MIL. Remedial action may be taken by the controller 530 when the DTC is reported or the MIL is illuminated. A code clear command and/or battery reset may be the only actions required to reset the DTC and/or MIL to an original state and return the vehicle 5 to an operational condition. It will be appreciated by those skilled in the art that there may be other ways to restore the original state such as a command sent from an externally connected device, controller software/calibration flash, or a specific set of other actions such as button presses or key maneuvers.

Figure 5:
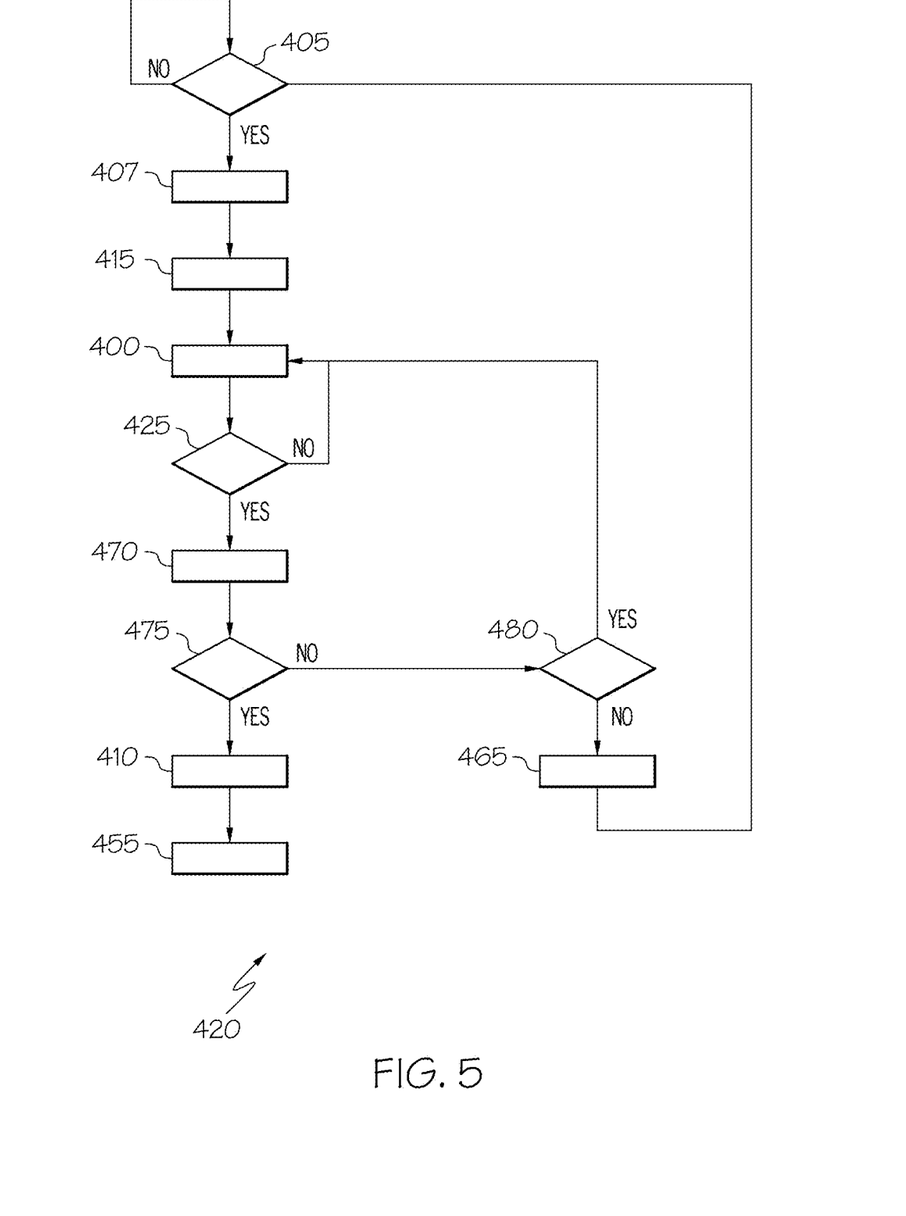
FIG. 5 depicts a flowchart of the Diagnostic Trouble Code determination according to another aspect of the present invention.

Referring now to FIG. 5, in another embodiment, the DTC fault determination may use a moving window to report a leak. The DTC fault determination may run when the vehicle 10 is in an active state 405 as described above. When the vehicle 10 is in an active state 405, the cycle 300 begins 407. Once the dual fault maturation algorithm 420 makes a low trip determination 415, the dual fault maturation algorithm 420 evaluates the DTC fault determination 400. The DTC fault determination 400 may increment a moving window count by one 430 in the computer readable medium when at least one failure count 425 was recorded for the cycle. On subsequent cycles, the DTC fault determination 400 will continue to increment the first count when at least one 430 when a failure count 425 is recorded for that cycle 300. The moving window may include at least one moving window count and at least one window threshold to make the determination of when to report the DTC and/or illuminate the MIL. The moving window count may increment by one 470 when the number of cycles 300 in which the failure count 425 is indicated at least once in a cycle 300 during the duration of the moving window. The moving window may stay active or open until the failure count equals or exceeds the window threshold 475. In other words, the moving window "moves" along as the cycle 300 progresses to count the number of failure counts 425 as long as the vehicle 10 is in the active state 480. The moving window may move along one cycle 300 or a plurality of sequential cycles 300. The moving window count does not end or reset until the window threshold is equaled or exceeded 475. Therefore, the size, or duration, of the moving window is adjustable to account any quantity of numbers of cycles 300 that may need to pass until the window threshold is equaled or exceeded. Once the window threshold is equaled or exceeded 475, the controller 530 may report a leak. The report 410 may include the DTC and/or illuminate the MIL. 480. One the coolant leak is reported 410, remedial action 455 may be taken. If the vehicle 10 is no longer in an active state, the cycle ends 465.

Figure 6:
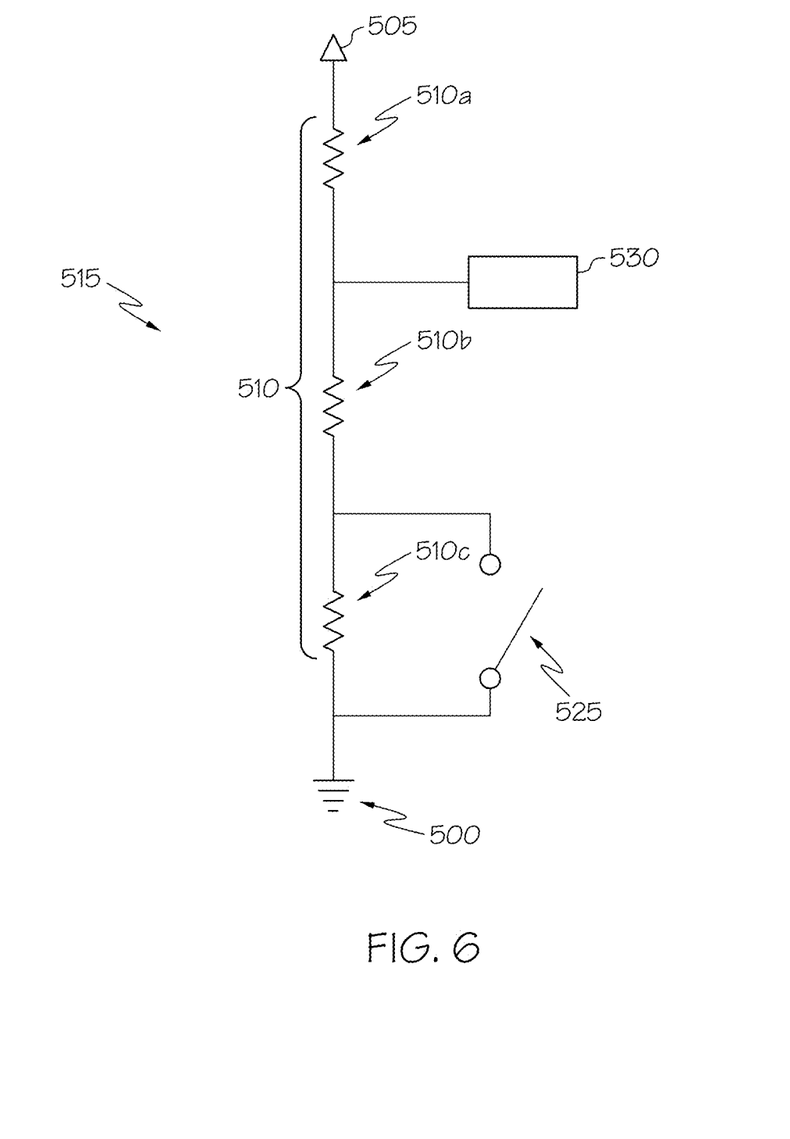
FIG. 6 depicts a schematic of a coolant level sensor according to an aspect of the present invention.

FIG. 6 is a schematic of an electrical circuit 515. In addition to the coolant level sensor 255 of FIG. 2 for detecting the coolant level, a resistor ladder network 510 such that it acts as a switch that, in conjunction with an outside controller, may be used to diagnose coolant leakages or related losses, as well as to help the controller distinguish the difference between a shorted sensor and an actual low coolant condition. The electrical circuit 515 may be electrically cooperative with a switch 525 of the coolant level sensor 255 of FIG. 2. A voltage source 505 and a ground source 500 provide power for the electrical circuit 515. The resistor ladder network 510 consists of a plurality of resistors. As an example three resistors are shown in FIGS. 6, 510*a*, 510*b*, and 510*c*. The switch 525 may be electrically coupled to the resistor ladder network 510, the voltage source 505, and the ground source 500. Some, all, or none of the resistor ladder network may reside in controller 530. Controller 530 measures values from the resistor ladder network to determine the state of the sensor. For example, the controller 530 may measure a first resistor voltage value and a second resistor voltage value at two points in the resistor ladder network and compare the first resistor voltage value to the second resistor voltage value to determine the state of the sensor. The switch 525 may be chosen from a reed switch and a float switch. The switch 525 may be located in the coolant reservoir 220 of FIG. 2 or the geometric low point in a battery tray (not shown). For example, if the switch 525 is located in the battery tray, the switch 525 may indicate the presence of a liquid when placed in the lowest point of the battery tray. The dual fault maturation algorithm described above may be able to discern the presence of a liquid and indicate and remediate a coolant leak identical to the detection of the low level of coolant in the coolant reservoir 220.

In some embodiments, a second coolant level sensor (not shown) may be located in the battery tray to supplement the dual fault maturation algorithm. The dual fault maturation algorithm may sample the second coolant level sensor alone or in combination with the coolant level sensor 255. The dual fault maturation algorithm may report a DTC or indicate a MIL upon either of the coolant level sensors sensing a leak or the dual fault maturation algorithm may prioritize the coolant level sensors, requiring one to sense a leak before the other sensed leak is reported or indicated.

The dual fault maturation algorithm may run in substantially the same manner with the second coolant level sensor as it does with the coolant level sensor 255. For example, the controller 530 may sense a second switch signal from the second coolant level sensor during the sampling window and count a T-time increment of the sampling window while the second coolant level sensor signals the closed switch signal. The controller 530 may then cease to count the T-time increment in the sampling window when the second coolant level sensor signals the open switch signal and reset the T-time increment to zero after the sampling window. The controller 530 may record a second failure count in a computer readable medium if the T-time increment equals the first threshold value and sense the second switch signal with more than one sampling window sequentially during the cycle. The controller 530 may increment the third threshold by one in the computer readable medium when at least one second failure count is recorded for the cycle and increment a fourth count for a T-number of cycles since the third threshold was first incremented. If the third threshold equals the first threshold value before the fourth count exceeds the second threshold, the controller 530 may report the DTC and illuminate the MIL. If the second count exceeds the second threshold then the controller 530 may reset the fourth count and the third count to zero.

In another embodiment, the dual fault maturation algorithm may sense the second coolant level sensor with a second moving window. The second switch signal from the second coolant level sensor is sensed during the sampling window. A T-fail counter counts the software of the sampling window while a second coolant level sensor signals the specified switch signal and the T-fail counter is reset after the sampling window. A second failure count is recorded in the computer readable medium if the T-fail counter equals the third threshold. The second switch signal is sensed with more than one sampling window sequentially during the cycle and a second moving window count is incremented by one in the computer readable medium when at least one second failure count is recorded for the cycle. The coolant leak is reported when the second moving window count equals or exceeds a second window threshold.

The controller 530 may be cooperative with the resistor ladder network 510 to receive the switch signal from the switch 525 as well as to help the controller distinguish the difference between a shorted sensor and an actual low coolant condition. The controller 530 may include at least one processor and the computer readable medium such that instructions stored in the computer readable medium are executed by the at least one processor to control through changes in the switch signal to determine a low coolant level. The instructions may include the dual fault maturation algorithm described above. Electrical circuit 515 failure readings of the switch 525 read by the controller 530 may include "Out-of-range Low", "Out-of-range High" and "Invalid, but in-range" values.

The present disclosure may be embodied in hardware and/or in software (including firmware, resident software, microcode, etc.). The system controller may have at least one processor and the computer-readable medium. A computer-usable or the computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber (example of propagation medium), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a source of motive power, a vehicle incorporating the source of motive power or other equipment that may make up, or be used in conjunction with, the vehicle or source of motive power. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of detecting a coolant leak in an automotive battery pack, the method comprising:
    sensing a low-level switch signal from a coolant level sensor during a sampling window wherein the sampling window is divided up into a plurality of software iterations;
    incrementing a fail counter for each software iteration while the coolant level sensor indicates a low level coolant condition;
    recording a failure count in a non-transitory computer readable medium for the sampling window if the fail counter equals or exceeds a threshold;
    resetting the fail counter after the duration of the sampling window is complete;
    sensing the low-level switch signal with more than one sampling window sequentially during a cycle, wherein the cycle is period of time while the automotive battery pack is in an active state;
    incrementing a moving window count by one in the non-transitory computer readable medium when at least one failure count is recorded for the cycle;
    resetting the fail counter, failure count, and the moving window count when a stop event occurs wherein the stop event indicates the automotive battery pack is no longer in the active state; and
    reporting the coolant leak when the moving window count equals or exceeds a window threshold.

2. The method of claim 1, wherein reporting the coolant leak includes reporting a Diagnostic Trouble Code and illuminating a Malfunction Indicator Light.

3. The method of claim 2, further comprising taking remedial action when the Diagnostic Trouble Code is reported.

4. The method of claim 3, wherein remedial action is chosen from disabling a charging circuit of a vehicle, disabling the use of a high voltage circuit of the vehicle, disabling a propulsion control unit of the vehicle, and combinations thereof.

5. The method of claim 1, wherein the coolant level sensor is located in a coolant reservoir.

6. The method of claim 1, further comprising enabling the sensing of the coolant level sensor when a set of algorithm conditions are met, comprising:
    detecting a temperature of a battery pack and enabling the sensing of the coolant level sensor if the temperature of the battery pack is within a predetermined pack temperature range;
    detecting a temperature of a coolant and enabling the sensing of the coolant level sensor if the temperature of the coolant is within a predetermined coolant temperature range;
    detecting a vehicle speed and enabling the sensing of the coolant level sensor if the vehicle speed is within a predetermined speed; and
    detecting a vehicle orientation and enabling the sensing of the coolant level sensor if the vehicle orientation matches a predetermined orientation.

7. The method of claim 6, wherein enabling the sensing of the coolant level sensor further comprises detecting a coolant pump speed and enabling the sensing of the coolant level sensor if the coolant pump speed is sufficient to reduce an amount of trapped air in a thermal management system.

8. The method of claim 1, wherein a second coolant level sensor is located in a geometric low point in a battery tray and further comprising:
- sensing a second switch signal from the second coolant level sensor during the sampling window;
- counting a T-fail counter of the sampling window a second coolant level sensor signals the specified switch signal;
- resetting the T-fail counter after the sampling window;
- recording a second failure count in the non-transitory computer readable medium if the T-fail counter equals the third threshold;
- sensing the second switch signal with more than one sampling window sequentially during the cycle;
- incrementing a second moving window count by one in the non-transitory computer readable medium when at least one second failure count is recorded for the cycle;
- reporting the coolant leak when the second moving window count equals or exceeds a second window threshold.

9. The method of claim 8, further comprising enabling the sensing of the second coolant level sensor when a set of algorithm conditions are met comprising:
- detecting a temperature of a battery pack and enabling the sensing of the coolant level sensor if the temperature of the battery pack is within a predetermined pack temperature range;
- detecting a temperature of a coolant and enabling the sensing of the coolant level sensor if the temperature of the coolant is within a predetermined coolant temperature range;
- detecting a vehicle speed and enabling the sensing of the coolant level sensor if the vehicle speed is within a predetermined speed; and
- detecting a vehicle orientation and enabling the sensing of the coolant level sensor if the vehicle orientation matches a predetermined orientation.

10. A leak detection apparatus for a rechargeable energy storage system (RESS), the apparatus comprising:
- a RESS thermal management system configured to provide thermal management of the RESS, comprising:
  - a switch;
  - a voltage source;
  - a ground source;
- a resistor ladder network electrically coupled to the switch, the voltage source, and the ground source; and
- a controller electrically coupled to the RESS thermal management system, at least one processor, and a non-transitory computer readable medium running a dual fault maturation algorithm, which when executed, cause the rechargeable energy storage system to:
  - sense a low-level switch signal from the switch during a sampling window wherein:
    - the sampling window is divided up into a plurality of software iterations, and
    - each software iteration is a discrete amount of time;
  - increment a fail counter for each software iteration while the switch indicates a low level coolant condition;
  - record a failure count in a non-transitory computer readable medium for the sampling window if the fail counter equals or exceeds a threshold;
  - reset the fail counter after the duration of the sampling window is complete;
  - sense the low-level switch signal with more than one sampling window sequentially during a cycle, wherein the cycle is period of time while the automotive battery pack is in an active state;
  - increment a moving window count by one in the non-transitory computer readable medium when at least one failure count is recorded for the cycle;
  - resetting the fail counter, failure count, and the moving window count when a stop event occurs wherein the stop event indicates the automotive battery pack is no longer in the active state; and
  - report the coolant leak when the moving window count equals or exceeds a window threshold.

11. The apparatus of claim 10, wherein reporting the coolant leak includes reporting a Diagnostic Trouble Code and illuminating a Malfunction Indicator Light.

12. The apparatus of claim 10, further comprising:
- a charging circuit electrically coupled to the battery pack;
- a high voltage circuit to distribute power to a vehicle and electrically coupled to the battery pack;
- a propulsion control unit to propel the vehicle and electrically coupled to the battery pack; and
- wherein reporting a coolant leak comprising disabling the charging circuit of the vehicle, disabling the use of the high voltage circuit of the vehicle, disabling the propulsion control unit of the vehicle, and combinations thereof.

13. The apparatus of claim 12, wherein the parameters of the dual fault maturation algorithm further comprises a code clear command to reset the Diagnostic Trouble Code, Malfunction Indicator Light, charging circuit, high voltage circuit, and the propulsion control unit and combinations thereof to their original operating state.

14. The apparatus of claim 10, further comprising:
- a battery pack temperature sensor to sense a temperature of a battery pack;
- a coolant temperature sensor to sense a temperature of a coolant;
- a vehicle speed sensor to sense a vehicle speed;
- a vehicle orientation sensor to sense a vehicle orientation; and
- wherein the dual fault maturation algorithm enables the sensing of the switch when a set of algorithm conditions are met, the set of algorithm conditions comprising:
  - a predetermined pack temperature range is sensed by the battery pack temperature sensor;
  - a predetermined coolant temperature range is sensed by the coolant temperature sensor;
  - a predetermined speed is sensed by the vehicle speed sensor; and
  - a predetermined orientation is sensed by the vehicle orientation sensor.

15. The apparatus of claim 10, wherein the switch is chosen from a reed switch and a float switch.

16. The apparatus of claim 10, wherein the switch is fluidly coupled to a coolant reservoir.

17. The apparatus of claim 10, wherein the switch is located in a geometric low point in a battery tray.

18. A method of detecting a coolant leak in an automotive battery pack, the method comprising:
- sensing a temperature of the automotive battery pack;
- enabling the sensing of a coolant level sensor when the temperature of the automotive battery pack is within a predetermined pack temperature range;
- sensing a low-level switch signal from the coolant level sensor during a sampling window when enabled, wherein the sampling window is divided up into a plurality of software iterations;
- incrementing a fail counter for each software iteration while the coolant level sensor indicates a low level coolant condition;

recording a failure count in a non-transitory computer readable medium for the sampling window if the fail counter equals or exceeds a first threshold value;

resetting the fail counter after the duration of the sampling window is complete;

sensing the low-level switch with more than one sampling window sequentially during a cycle, wherein the cycle is period of time while the automotive battery pack is in an active state;

incrementing a first count by one in the non-transitory computer readable medium when at least one failure count is recorded for the cycle;

incrementing a second count for a number of cycles since the first count was incremented from zero;

resetting the fail counter, the failure count, and first count to zero when a stop event occurs wherein the stop event indicates the automotive battery pack is no longer in the active state; and resetting the second count and the first count when the second count exceeds a second threshold value.

19. The method of claim 18, further comprising reporting the coolant leak when the first count equals or exceeds the first threshold value before the second count equals or exceeds the second threshold value.

* * * * *